United States Patent [19]

Krips et al.

[11] Patent Number: 4,875,270

[45] Date of Patent: Oct. 24, 1989

[54] METHOD OF SECURING PARTS TO A HOLLOW MEMBER

[75] Inventors: Herbert Krips, Bochum; Miroslan Podhorsky, Ratingen, both of Fed. Rep. of Germany

[73] Assignee: Balcke-Dürr Aktiengesellschaft, Fed. Rep. of Germany

[21] Appl. No.: 325,068

[22] Filed: Mar. 15, 1989

Related U.S. Application Data

[63] Continuation of Ser. No. 82,037, Aug. 5, 1987, abandoned.

[30] Foreign Application Priority Data

Aug. 12, 1986 [DE] Fed. Rep. of Germany ....... 3627258
Jan. 27, 1987 [EP] European Pat. Off. ......... 87101122.7

[51] Int. Cl.⁴ ...................... B23P 17/00; B23P 11/02; B21D 39/00
[52] U.S. Cl. ............................. 29/421.1; 29/447; 29/523; 29/283.5; 29/800; 74/567; 285/381; 285/382.4; 403/273; 403/274
[58] Field of Search .............. 29/447, 523, 421, 285.5, 29/800; 74/567; 285/381, 382.4; 403/273, 274

[56] References Cited

U.S. PATENT DOCUMENTS

| | | | |
|---|---|---|---|
| 2,892,254 | 6/1959 | Garvin ........................... | 74/567 UX |
| 2,960,141 | 11/1960 | Rutter ............................. | 72/62 |
| 3,739,456 | 6/1973 | Scherer et al. ................... | 29/447 |
| 3,977,068 | 8/1976 | Krips ............................. | 29/421 R |
| 3,979,810 | 9/1976 | Krips et al. .................... | 29/157.4 |
| 3,999,277 | 12/1976 | Hamada ............................ | 29/447 |
| 4,332,073 | 6/1982 | Yoshida et al. .................. | 29/421.1 |
| 4,377,894 | 3/1983 | Yoshida .......................... | 29/447 X |
| 4,513,598 | 4/1985 | Costabile ......................... | 72/62 |
| 4,616,389 | 10/1986 | Slee .............................. | 29/447 X |
| 4,660,269 | 4/1987 | Suzuki ........................... | 29/523 |
| 4,693,138 | 9/1987 | Hughes et al. .................. | 74/567 |

FOREIGN PATENT DOCUMENTS

| | | |
|---|---|---|
| 0015712 | 9/1980 | European Pat. Off. . |
| 3323640 | 1/1984 | Fed. Rep. of Germany . |
| 2548079 | 1/1985 | France . |
| 21299 | 6/1971 | Japan . |
| 149655 | 9/1982 | Japan ................................. 74/567 |
| 282663 | 12/1986 | Japan ................................. 74/567 |
| 402448 | 5/1974 | U.S.S.R. . |
| 1123828 | 11/1984 | U.S.S.R. . |
| 2050207 | 1/1981 | United Kingdom . |

OTHER PUBLICATIONS

Issatschwenkow E. I., "Pressen durch Gummi und Flussigkeit", M. Maschgis, 1962, S. 244–245, FIG. 172 (German translation) of title.

*Primary Examiner*—Charlie T. Moon
*Attorney, Agent, or Firm*—Becker & Becker, Inc.

[57] ABSTRACT

A method and apparatus for securing one or more parts, each of which is provided with an opening, to a hollow member. In the starting state, the inner diameter of the opening of the parts is greater than the outer diameter of the surface provided on the hollow member for securing the part. The parts are placed in the prescribed position on the hollow member prior to the securing operation. In order in a simple and economical manner to reliably secure the parts to the hollow member without the danger of overstressing the latter, and without the danger that the parts will loosen, a temperature difference is produced, prior to placing the parts on the hollow member, by heating the parts and/or by cooling the hollow member. Subsequently, each part is secured to the hollow member by widening the latter at least in the securing regions thereof, and by a subsequent shrink fitting of the parts onto the hollow member as a consequence of the temperature equalization that occurs.

3 Claims, 8 Drawing Sheets

METHOD OF SECURING PARTS TO A HOLLOW MEMBER

This application is a continuation of application Ser. No. 082,037 filed Aug. 5, 1987, now abandoned.

BACKGROUND OF THE INVENTION

The present invention relates to a method and apparatus for securing one or more elements or parts, each of which is provided with an opening, to a hollow member, especially cams, bearing rings, and/or drive elements to a hollow shaft. In the starting state, the inner diameter of the opening formed in the parts is greater than the outer diameter of the surface provided on the hollow member for securing said parts. The parts are placed in the prescribed position on the hollow member prior to the securing operation.

It is known in many fields, instead of machining complicated parts from a single solid piece, to produce these parts by securing appropriately shaped supplementary parts to a base member, so that the exterior shape of the component can be produced in the most economical manner. The supplementary parts are secured to the base member by being welded, soldered, shrunk-fit, glued, or otherwise joined thereto. In order to save material and/or weight, hollow members are also frequently used as the base member. In this case also, in the starting state the opening in the part that is to be secured to the hollow member is greater than the securing location of the hollow member, so that the respective part can be placed in the prescribed position on the hollow member prior to starting the securing operation.

In welding and soldering operations, localized thermal stresses occur, especially in the hollow member; these thermal stresses can lead to undesired and difficult-to-control deformations or changes. The drawback of securing the parts by gluing them is that one can never be entirely sure that the contact surfaces are completely wetted or coated with the adhesive.

In the shrink-fit process, the outer diameter of the support location and the inner diameter of the opening in the part that is to be shrunk-fit must be produced with great precision in order to comply with the small tolerances that are required for the desired retention. The difference in diameter achieved by the temperature difference is proportional to the temperature starting point between the components, the temperature coefficients of expansion, and the radii of the components. Since the elastic deformation of the components that are to be interconnected is proportional to the square of the radius, and since the temperature difference that can be achieved in practice is limited, in many cases it is possible to obtain only an unsatisfactory adhesion, especially with certain combinations of materials. Shrunk-fit parts can become loosened, especially when temperature differences due to operation occur in the components.

It is an object of the present invention to provide a method and apparatus of the aforementioned general type, in a simple and economical manner, via which parts ca be reliably secured to a hollow member without the danger of overstressing the hollow member or of a loosening of the parts.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
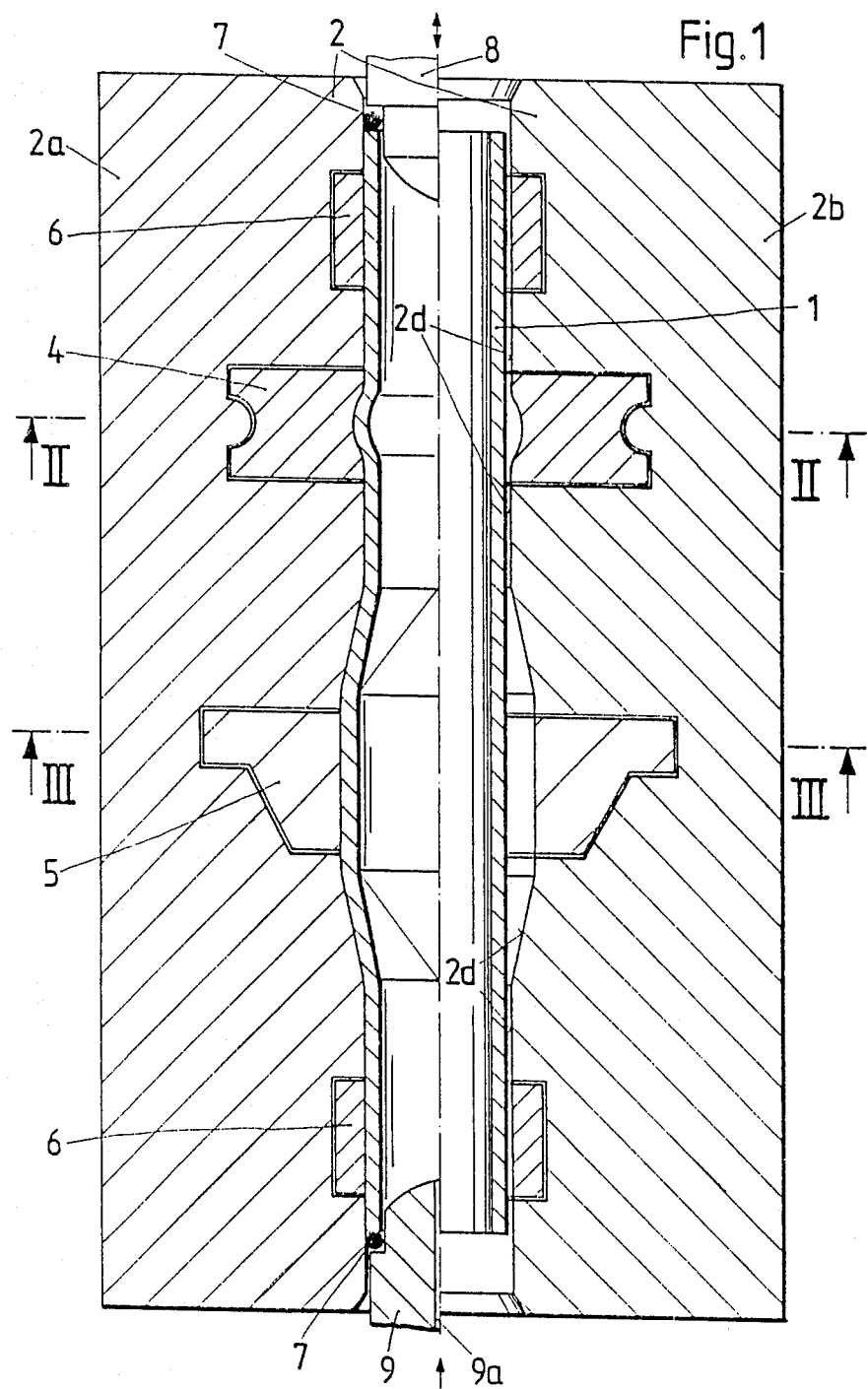
FIG. 1 is a longitudinal cross-sectional view through a two-part matrix for a first exemplary inventive embodiment of a hollow member that is to be provided with four parts, with the right half of the drawing illustrating the starting condition and the left half illustrating the end position.

The method of the present invention is characterized primarily by the steps of: prior to placing of the parts on the hollow member, producing a temperature difference by heating the parts and/or by cooling the hollow member; and securing each part to the hollow member by widening the latter at least in the securing region or regions thereof and by a subsequent shrink fitting of the parts onto the hollow member as a consequence of the temperature equalization that occurs. Pursuant to a further feature of the invention, the expansion or widening of the hollow member is effected by the introduction, especially hydraulically, of a pressure medium; however, widening can also be effected by blasting, electro-hydraulic expansion, or mechanical or magnetic forces.

As a result of the widening, the hollow member is plastically deformed, so that pursuant to the inventive method, only very approximate tolerances have to be maintained with regard to the inner diameter of the opening in the parts that are to be secured, and with regard to the outer diameter of the pertaining support locations on the hollow member, thus reducing manufacturing costs. As a result of the widening of the hollow member, not only can a frictional securing of the parts be effected, but a form-fitting securing can also be effected, with the required deformation forces for achieving the respectively necessary retaining force being easy to generate in a hydraulic expansion procedure by an appropriate choice of parameters. The retaining force achieved as a result of the widening is a product of the greater elastic return deformation of the part that surrounds the hollow member. This retention force is increased by the fact that, subsequent to the widening, a shrink-fitting operation takes place as the temperatures between the warmer parts that are to be secured and the colder hollow member are equalized.

For this reason, the inventive method is also suitable for securing thin-walled parts, such as sleeves and bushings, where an elastic return deformation after only a widening of the hollow member would result in an only unsatisfactory connection. With the inventive method, the retention force is a function of the widening parameter, the temperature difference, and the temperature coefficients of expansion of the materials of the parts that are to be connected. These three parameters can be varied in conformity with the bonding that is desired, and can be calculated ahead of time since the properties of the materials are known. Thus, on the whole, the present invention provides a reproducible and precise method for securing parts to a hollow member. The method requires only little outlay or capital expenditure, so that it can even be carried out in an economical manner for smaller production runs.

Pursuant to a further feature of the present invention, the hollow member can be widened with different pressures or parameters in the region of the securing locations of the individual parts if several different parts are to be secured on the same hollow member.

Pursuant to one inventive embodiment, the novel apparatus can be characterized by an at least two-part matrix, the planes of separation of which extend in the axial direction, with the matrix having recesses, which conform to the respective widening of the hollow member, not only for the latter but also for the part or parts that are to be secured to this hollow member; the matrix is also provided with support surfaces for the regions of the hollow member disposed between the parts. The hollow member, which is with parts that have a higher temperature, is placed into the opened matrix, simultaneously resulting in an exact positioning of the parts on the hollow member. After the matrix is closed, pressure medium is introduced into the hollow member for example, at a prescribed pressure, so that the hollow member is widened in the region of the securing locations of the parts. Depending upon the shape of the connection surface between the hollow member and the part that is to be secured thereto, a frictional and/or form-fitting connection results from this widening. After the matrix is opened, the finished component, which is produced in a single operation, is removed, with the shrink-fitting operation taking place not only during the widening but also subsequently when the temperatures between the warmer parts and the colder hollow member are equalized.

The use of this inventive matrix permits all of the parts to be secured to the hollow member with a single pressure, namely the highest required pressure, since the matrix supports the weaker structural parts, such as those portions of the hollow member between the parts that are to be secured, so that these portions are reliably protected from being overstressed.

Pursuant to an alternative embodiment of the present invention, the novel apparatus is characterized primarily by a probe that can be inserted into the hollow member, with pairs of sealing rings being disposed on the outer surface of the probe, the spacing between the rings of a given pair of rings corresponding to the axial dimension of the opening of the part that is to be secured, whereby each region between successive pairs of sealing rings being provided with at least one venting channel. Due to the pairs of sealing rings, the widening of the hollow member is limited to the respective securing locations. In order to preclude widening of the hollow member between these locations, the probe is provided between the pairs of sealing rings with venting channels that prevent an undesired buildup of pressure in these portions of the hollow member.

Further specific features of the present invention will be described in detail subsequently.

DESCRIPTION OF PREFERRED EMBODIMENTS

Figure 2:
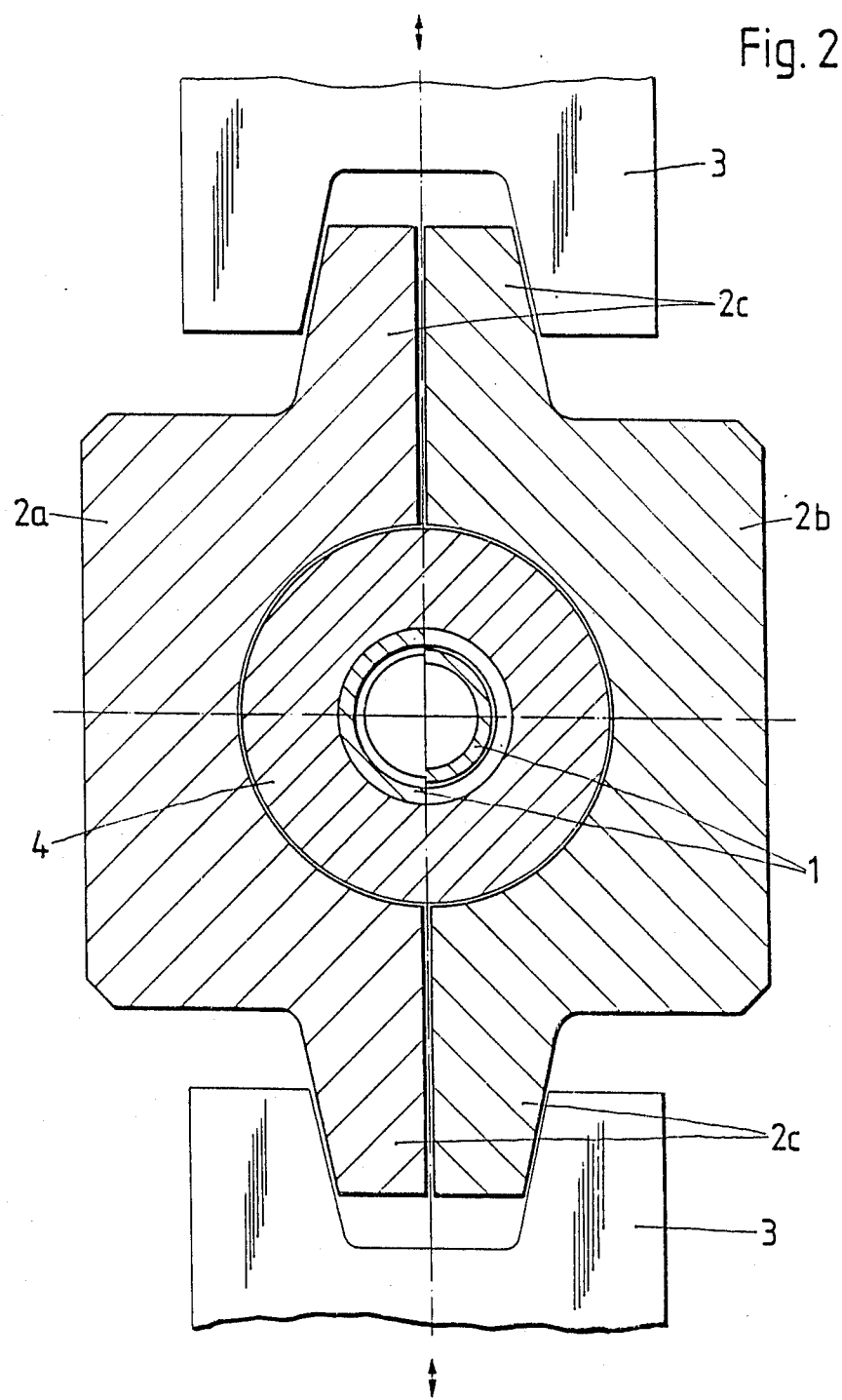
FIG. 2 is a cross-sectional view taken along the line II—II in FIG. 1, with the right half again illustrating the starting condition and the left half the ending position.
Figure 3:
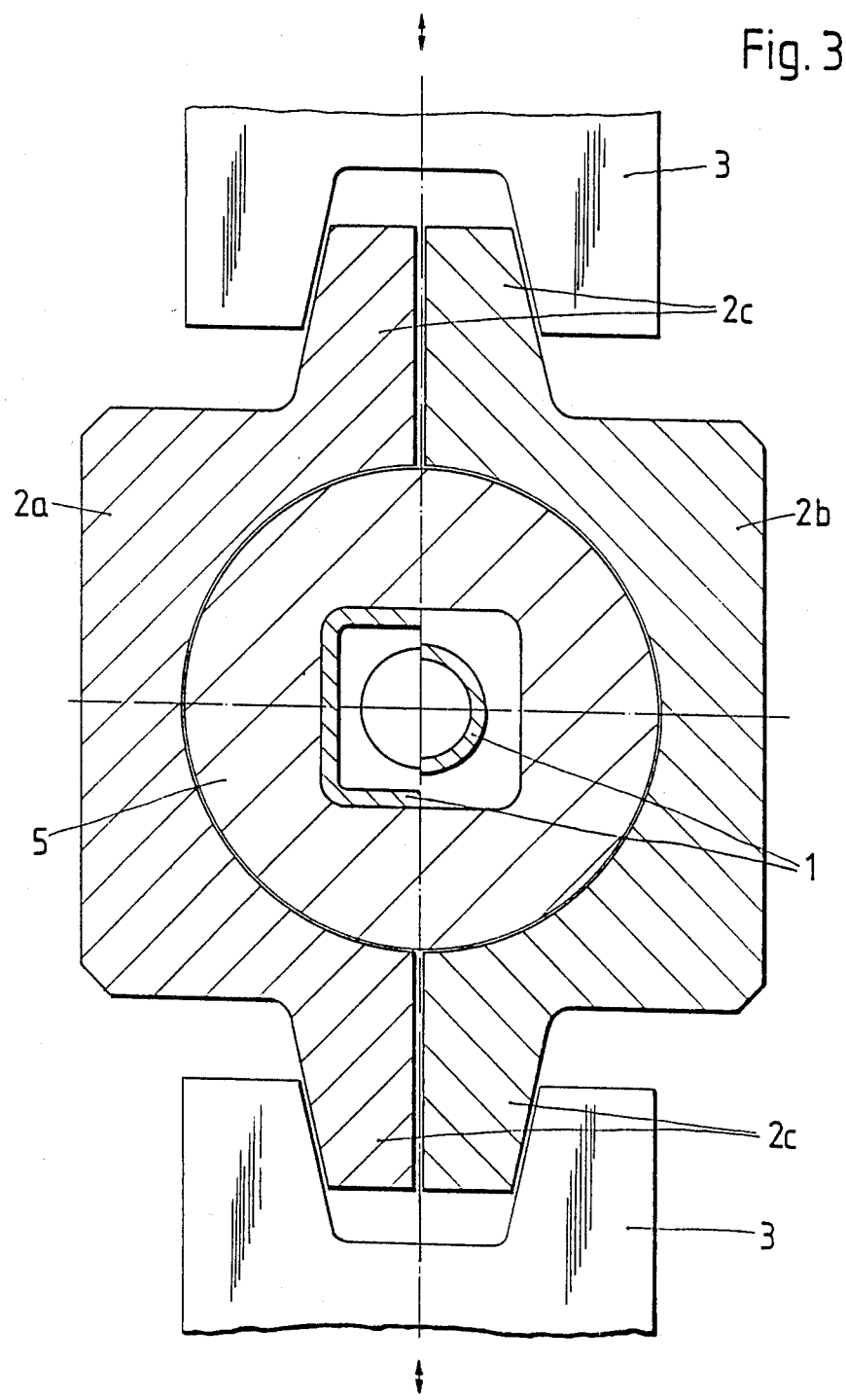
FIG. 3 is a further cross-sectional view taken along the line III—III in FIG. 1, and again shows the starting and ending positions.

Referring now to the drawings in detail, the first embodiment shown in FIGS. 1 to 3 shows a cylindrical hollow member 1 that has a circular cross-sectional shape and is placed in a central opening of a matrix 2. This matrix 2 comprises the two matrix halves 2a and 2b, which are provided with flanges 2c on their oppositely disposed longitudinal sides. The matrix halves 2a and 2b can be clamped or otherwise joined together via these flanges 2c, as indicated in FIGS. 2 and 3 by transversely movable clips or clamps 3.

Prior to placing the hollow member 1 into the matrix 2, in the embodiment of FIG. 1 four previously heated elements 4 5, and 6 are placed onto the hollow member 1. Appropriate recesses are formed in the matrix halves 2a and 2b for these parts 4, 5, 6, so that after the hollow member that is provided with the parts 4, 5, 6 has been placed into the matrix 2, an orderly and proper positioning of the parts 4, 5, 6 relative to the hollow member 1 results.

As the various right halves of FIGS. 1 to 3 show, in the starting position the openings formed in the parts 4, 5, and 6 are larger than the corresponding mounting locations on the hollow member 1 where these parts are to be secured. In the illustrated embodiment, the openings in the parts 4 and 6 are circular and have a diameter that is slightly greater than the outer diameter of the hollow member 1 at the pertaining locations. As can be seen from FIG. 3, the opening in the part 5 is square, with the length of an edge thereof being greater than the outer diameter of the hollow member 1 at this location.

After the two matrix halves 2a and 2b have been closed, the central opening of the matrix 2 is closed at both ends. In the illustrated embodiment, this is achieved at one end by a plug 8 that is sealed off via a sealing member A connector 9 is used at the other end, and is also sealed off by a sealing member 7. Via a hole 9a in the connector 9, a pressure medium is introduced into the hollow member 1. This leads to widening of the hollow member 1, especially in the region of the mounting locations of the parts 4, 5, and 6. As a result, there results at the same time a tight connection between the hollow member 1 and the parts 4, 5, and 6. While the connection between the parts 4, 6 and the hollow member 1 is essentially frictional, an additional form-fitting connection results with the securing of the part 5, because in the region of the square opening of the part 5, the hollow member 1 is shaped or deformed in such a way that a form-fitting shape counteracts or opposes high twisting moments of the part 5 on the hollow member 1.

Support surfaces 2d can be provided in the matrix halves 2a and 2b between the recesses for the parts 4, 5, and 6. These support surfaces 2d prevent these portions of the hollow member 1 from expanding more than desired when pressure medium is applied to the hollow member.

After the plug 8 and he connector 9 have been pulled out from the ends, the clamps 3 have been withdrawn from the sides, and the matrix 2 has been opened, the hollow member 1 with the parts 4, 5, and 6 secured thereto, can be removed. The matrix 2 is then available for the next operation.

Already during the widening process, and also after the removal of the hollow member 1 with the parts 4, 5, and 6 secured thereto, an equalization of temperature between the warmer parts 4, 5, 6 and the cooler hollow member 1 takes place. In so doing, a shrink-fitting operation occurs which, in addition to the retaining force generated by the hydraulic widening, generates a retaining force that results from the reduction of the inner diameter of the opening in the parts 4, 5, and 6 during the cooling process, and that is a function of the temperature difference, the temperature coefficients of expansion of the materials, and the geometric dimensions of the parts. Instead of, or in addition to, heating up the parts 4, 5, and 6, the hollow member 1 could also be undercooled in order to generate this additional retaining force.

Figure 4:
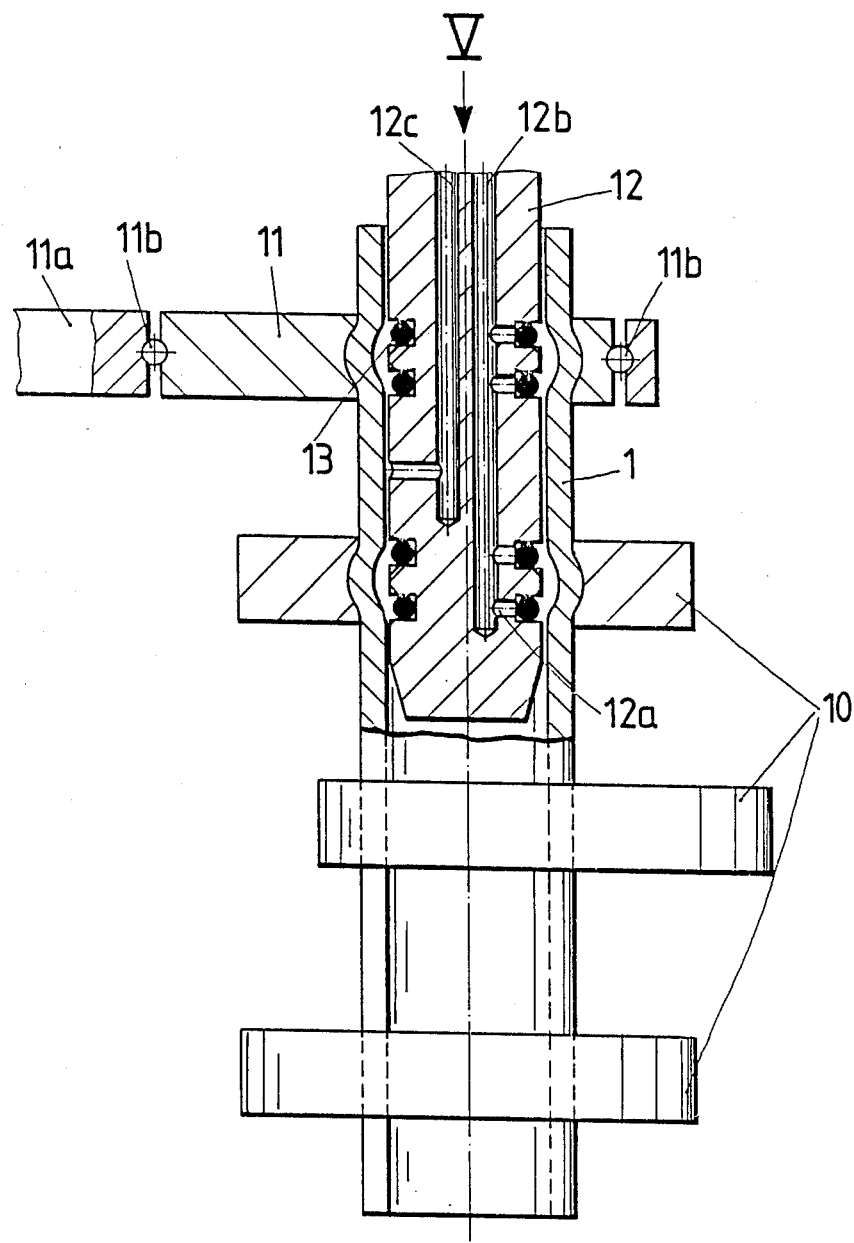
FIG. 4 is a partially sectioned side view of a second exemplary inventive embodiment of a hollow member that is to be provided with four parts.
Figure 5:
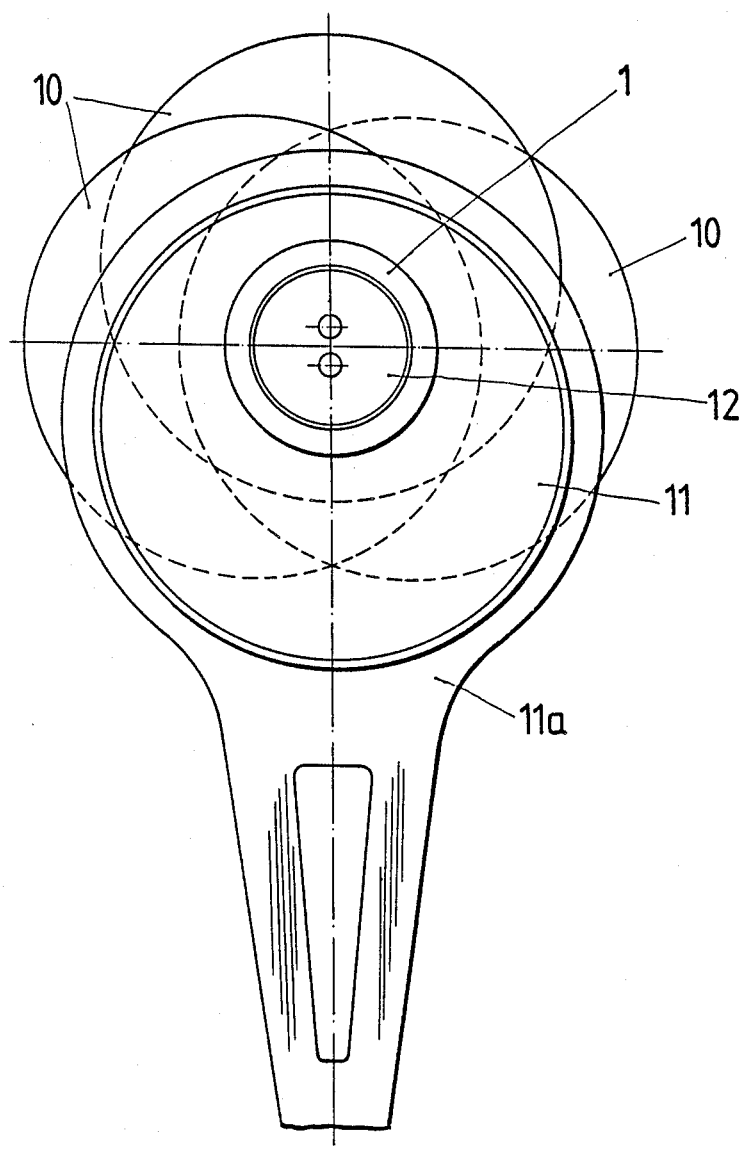
FIG. 5 is an end view taken in the direction of the arrow V in FIG. 4.

In the second embodiment, illustrated in FIGS. 4 and 5, four parts 10 and 11 are to be secured on a cylindrical hollow member 1 that has a circular cross-sectional shape. The parts 10 and 11 are secured with the aid of a probe 12 that can be introduced or inserted into the hollow member 1, and that has an outer diameter that is slightly less than the inner diameter of the hollow member 1 in the starting state. Pairs of sealing rings 13 are disposed on the probe 12 at the securing locations of the parts 1 and 11. Each pair of sealing rings 13 forms between them an expansion chamber that communicates via a connecting channel 12a with the central pressure channel 12b of the probe. Introduction of pressure medium into the central pressure channel 12b thus effects between each pair of sealing rings 13 a precise and selected expansion or widening of the hollow member 1. To assure that the portions of the hollow member 1 disposed between the pairs of sealing rings 13 do not have pressure applied thereto, each of these portions communicates with the atmosphere via a relief channel or vent 12c. The end view of FIG. 5 shows that the part 11, which is secured to the hollow member 1 by partial expansion, is embodied as a type of crank, the fixed part 11a of which is rotatable relative to the part 11, which is secured to the hollow member 1, via balls 11b. With this embodiment also, an additional shrinkfitting operation occurs in the manner described in connection with the first embodiment.

Figure 6:
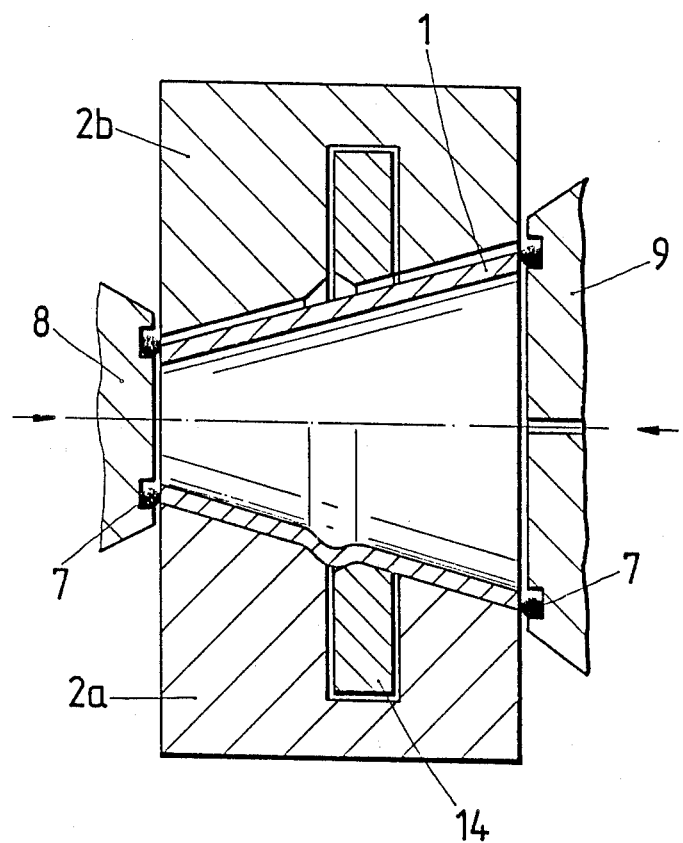
FIG. 6 is a view that shows a third exemplary embodiment of a hollow member that is disposed in a matrix and has a part that is to be secured thereto; with the top half of the drawing showing the starting state and the bottom half showing the ending state.

The third embodiment in FIG. 6 shows a conical hollow member 1 onto which is secured an annular element or part 14. The part 14 is again secured via a matrix 2 that comprises two matrix halves 2a and 2b, and that is provided with openings and recesses not only for the hollow member 1 but also for the part 14. The part 14 is again secured via hydraulic expansion in the securing region of the part 14. In this embodiment, a bead is produced in the region of the smaller diameter between the annular part 14 and the hollow member 1 in order to prevent the part 14 from sliding off of the conical hollow member 1. The part 14 is previously heated in order to generate an additional shrink-fitting operation.

Figure 7:
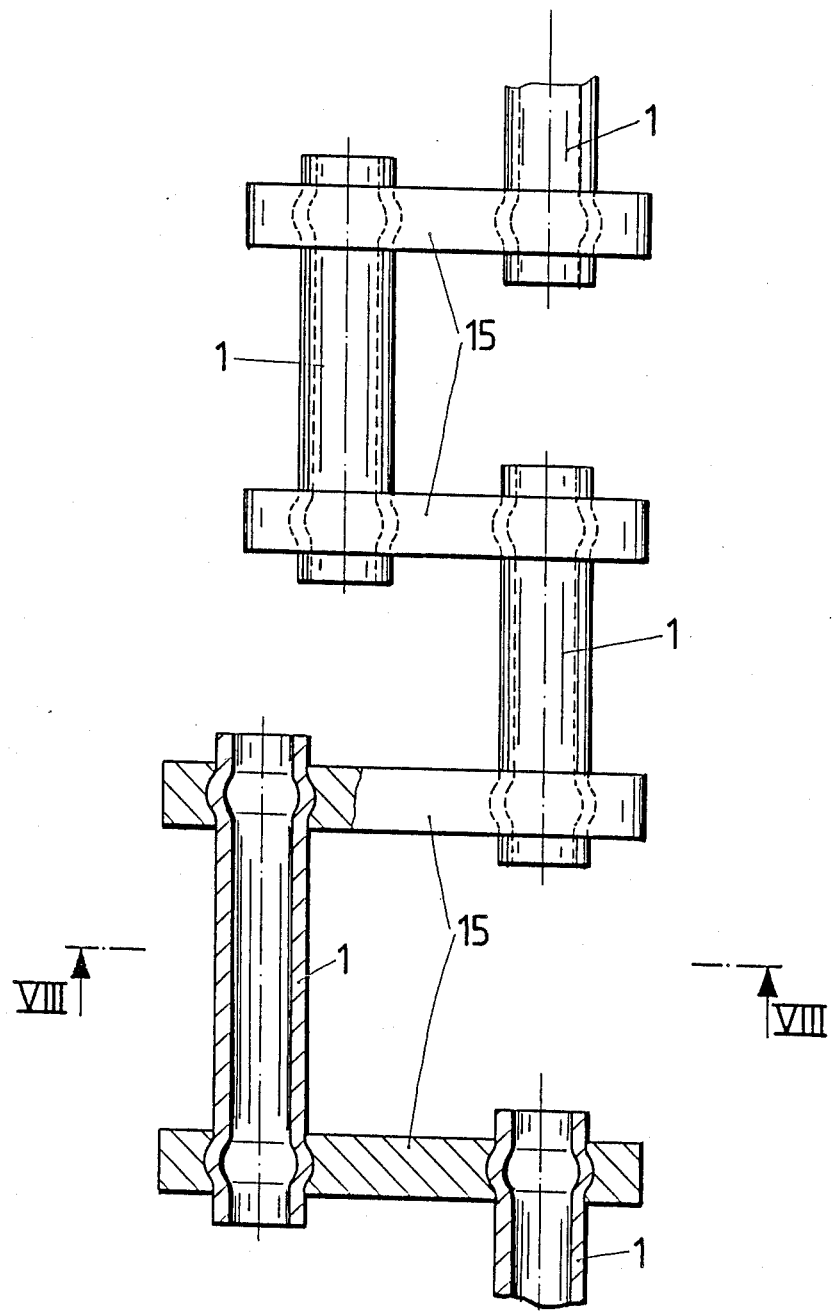
FIG. 7 is a partially sectioned side view showing a fourth exemplary embodiment, with several hollow members being respectively interconnected by the parts that are secured to them.
Figure 8:
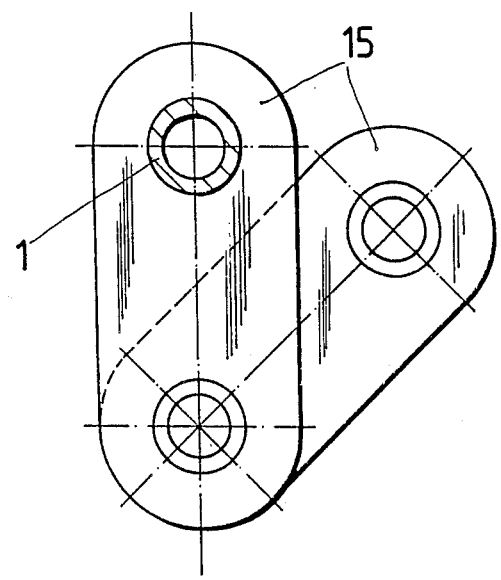
FIG. 8 is a cross-sectional view taken along the line VIII—VIII in FIG. 7.

Finally, the fourth embodiment of FIGS. 7 and 8 shows that several hollow members can be interconnected by respective elements or parts 15 pursuant to the previously described method. For the securing process required for this purpose, the hollow members 1 can be placed along with the previously heated parts 15 into a non-illustrated, multi-part matrix that is provided with appropriate openings and recesses for the hollow member 1 and the parts 15, and is also provided with channels for the supply of a pressure medium, so that the hollow members 1 are widened in the region of the securing locations of the parts 15. In so doing, it is possible to use different pressures for the expansions of the various hollow members 1. The cross-sectional view of FIG. 8 shows that the hollow members 1 do not necessarily have to be disposed in a common plane.

It should be noted that in place of the hydraulic expansion described in connection with the illustrated embodiments, it is also possible to undertake the expansion process via blasting, electro-hydraulic expansion, or mechanical or magnetic forces. Moreover it is possible, in addition to the parts illustrated in the drawing that are seated completely on the hollow member via openings, to also secure the parts to the ends of the hollow member, with these parts being seated on the ends via only a bore.

The present invention is, of course, in no way restricted to the specific disclosure of the specification and drawings, but also encompasses any modifications within the scope of the appended claims.

What is claimed is:

1. In a method of securing one or more parts, each of which is provided with an opening and at least one of which is a cam or other drive element able to transmit torque, to a hollow member, whereby in the starting state, the inner diameter of the opening of said parts is greater than the outer diameter of the surface provided on said hollow member for securing said part, and whereby said parts are placed supported via support surfaces of a matrix in the prescribed position along segments on said hollow member prior to the securing operation, the improvement therewith comprising in sequence the steps of:

prior to placing said parts on said hollow member, producing a temperature difference by heating said parts and/or by cooling said hollow member;

placing said parts subjected to said temperature differences on said hollow member; and supporting the outer surfaces of said parts as well as the regions of said hollow member disposed between said parts via the support surfaces of said matrix; and securing each of said parts to said hollow member by widening and expanding the securing regions of said hollow member, and followed by a subsequent shrink fitting of said parts onto said hollow member as a consequence of allowing temperature equalization to occur.

2. A method according to claim 1, which includes the step of effecting said widening of said hollow member by introducing a pressure medium therein.

3. A method according to claim 2, which, for securing several different parts onto a hollow member, includes the step of widening the securing regions of said hollow member with different pressures.

* * * * *